No. 807,768. PATENTED DEC. 19, 1905.
S. OTIS.
PIPE JOINT.
APPLICATION FILED APR. 29, 1904.
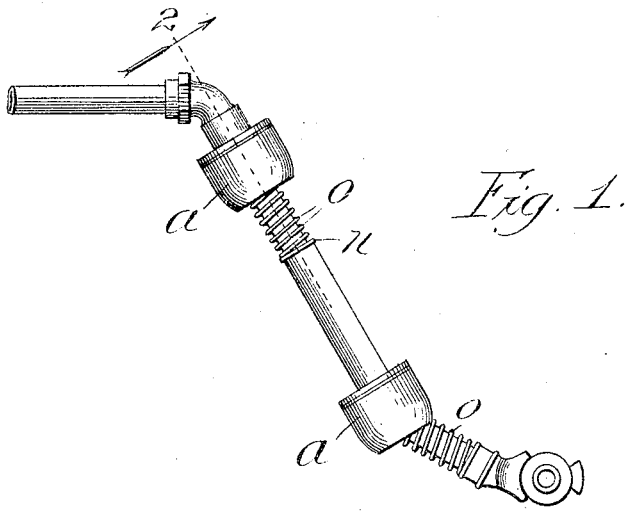
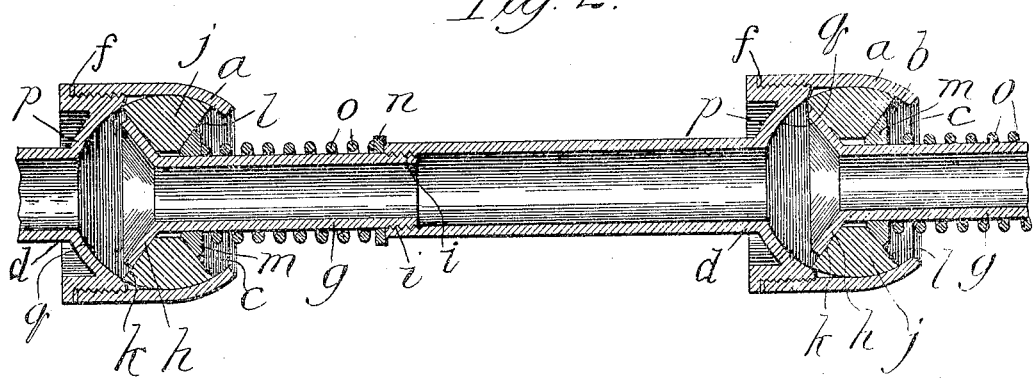
Witnesses:
C. E. Gaylord.
John Enders.
Inventor.
Spencer Otis,
By Thomas F. Sheridan,
Att'y

UNITED STATES PATENT OFFICE.

SPENCER OTIS, OF CHICAGO, ILLINOIS.

PIPE-JOINT.

No. 807,768.     Specification of Letters Patent.     Patented Dec. 19, 1905.

Application filed April 29, 1904. Serial No. 205,497.

*To all whom it may concern:*

Be it known that I, SPENCER OTIS, a citizen of the United States, residing at Chicago, in the county of Cook and State of Illinois, have invented certain new and useful Improvements in Pipe-Joints, of which the following is a specification.

My invention relates to that class of joints adapted to form a substantially air-tight articulate joint in a line of hose or air-pipe or to form an articulate joint between a section of hose or pipe and any other pipe or device to which it may be desirable to connect it.

The principal object of the invention is to provide a simple, economical, and efficient articulate joint for air-pipes, hose, or similar devices.

A further object of the invention is to provide, in an articulate joint for air-pipes containing fluid under pressure, suitable means for preventing the escape of such fluid, while permitting the movement of the parts joined thereto.

A further object of the invention is to provide, in an articulate joint for air-pipe or hose containing fluid under pressure, a socket portion connected to one of the parts of hose or pipe to be connected, a movable sleeve extending into such socket and adapted to be connected to another similar joint or to another portion of hose or pipe, a parti-spherical ring mounted in such socket portion and encircling the end of the movable sleeve, such ring being adapted to be held in engagement with the socket portion by means of the fluid under pressure, so as to form an air-tight connection between it and the socket portion, and means for forming an air-tight connection between the ring and movable sleeve.

A further object of the invention is to provide, in an articulate joint having ring mechanism removably mounted upon a movable sleeve and adapted to be held in engagement with the socket portion by the force of fluid under pressure, suitable means for removably holding the ring upon the sleeve and forming an air-tight connection between it and the sleeve.

Other and further objects of the invention will appear from an examination of the drawings and the following description and claims.

The invention consists in the features, combinations, and details of construction hereinafter described and claimed.

In the accompanying drawings, Figure 1 shows an air-pipe coupling connected with an air-pipe by means of a pair of my improved joints, and Fig. 2 is a longitudinal sectional elevation taken on line 2 of Fig. 1 looking in the direction of the arrow.

In the art to which this invention relates it is very desirable that means be provided whereby a line of air pipe or hose may be rendered flexible by providing one or more articulate joints adapted to form an air-tight connection between the parts of such hose or air-pipe connected thereby or between one or more similar joints which it may be found necessary or convenient to use together in order to afford the desired flexibility. It is particularly desirable in connection with air pipes or hose used in air-brake systems for railway-cars to provide one or more articulate joints adapted to afford the desired flexibility in the line of air pipe or hose and prevent the escape of the fluid, which is of necessity maintained under high pressure. It is also desirable to provide means whereby the relatively movable parts of the joint or joints will be held in air-tight engagement with each other by means of the fluid under pressure.

In constructing a joint in accordance with my improvements I provide a shell or socket portion $a$, formed, preferably, of wrought metal spun into parti-spherical form, so that its inner surface $b$ is concave or curved in all directions, gradually narrowing toward the opening or mouth $c$ of the socket. A neck portion $d$ of the socket is mounted in threaded engagement with the shell portion above described and is provided with screw-threads, by means of which it may be connected with the hose, air-pipe, or another steam-joint, as desired, a suitable gasket $f$ being mounted intermediate the neck and shell portions of the socket to form an air-tight connection therebetween. A movable sleeve $g$ is provided, having an annular shoulder $h$ at one end, which is inserted into the parti-spherical socket above described, such sleeve being provided with screw-threads $i$ upon its outer end, by means of which it is adapted to be connected with another piece of hose, pipe, or similar joint, and a ring $j$, made, preferably, of soft metal, such as Babbitt or lead, and having its outer annular surface parti-spherical and shaped to the same curve as that of the inner surface or parti-spherical end portion of the socket, is mounted inside the socket upon the shouldered end of the movable sleeve above described. This ring fits snugly but slidably upon the sleeve and is provided with beveled side surfaces $k$ and $l$, one of which engages the correspondingly-beveled side surface of the shoulder $h$ of the sleeve already described. A ring or collar $m$ is slidably mounted upon this sleeve on the opposite side of such parti-spherical ring and provided with a beveled surface adjacent to the beveled surface of such parti-spherical ring. In order to provide means for yieldingly holding this ring or collar $m$ in engagement with the parti-spherical ring and for holding such ring in engagement with the annular end shoulder of the sleeve, so as to form an air-tight connection between it and the sleeve, an end collar $n$ is mounted upon the outwardly-extending portion of the sleeve to form a fixed annular shoulder, and a spiral spring $o$ is mounted intermediate such collar and the ring $m$, so as to hold the latter yieldingly in engagement with the parti-spherical ring and form a yielding connection between the ring mechanism with the sleeve. The neck portion of the socket is expanded at the end where it is connected with the shell portion, so as to form a head or base $p$, which is hollowed out to form a parti-spherical or concave surface $q$ adjacent to the parti-spherical ring and which is adapted to prevent such ring from receding too far from the mouth of the socket.

By the above arrangement it will be readily seen that the parti-spherical ring is held tightly but movably in position against the inner walls of the shell by means of the fluid-pressure and that the beveled sides of such ring are held in yielding air-tight engagement with the annular end shoulder of the sleeve on one side and with the correspondingly-beveled ring on the other by means of the spring upon the sleeve, so that while the ring mechanism is removable from the sleeve and can be readily replaced when worn an air-tight connection is formed between such relatively movable parts.

I claim—

1. In a joint of the class described, the combination of a shell forming a socket, a movable sleeve extending into such socket, an annular shoulder upon such sleeve, and ring mechanism mounted in the socket encircling the sleeve and movable with relation to both of the sleeve and socket and having one side in engagement with such collar and an outer surface portion in engagement with the wall of the socket on the side of the ring opposite that which engages the annular shoulder of the sleeve, and means for yieldingly holding such ring mechanism and sleeve in position with relation to each other, substantially as described.

2. In a joint of the class described, the combination of a shell forming a socket, a movable sleeve extending into such socket an annular shoulder upon such sleeve, and ring mechanism mounted in engagement with such annular shoulder and having an outer surface portion in sliding engagement with the socket on the side of the ring opposite that which is in engagement with the annular shoulder of the sleeve, substantially as described.

3. In a joint of the class described, the combination of a shell forming a socket having a concave inner surface, a ring having a convex outer peripheral surface mounted in sliding engagement with the concave surface of the socket and having beveled side surfaces, a sleeve extending through such ring, and ring mechanism mounted upon such sleeve in yielding engagement with the beveled side surface of such first-mentioned ring and yieldingly connected with the sleeve, substantially as described.

4. In a joint of the class described, the combination of a shell forming a socket having an inner concave parti-spherical surface, a ring movably mounted in such socket having a convex peripheral surface in sliding engagement with the inner concave surface of the socket portion and having beveled side surfaces, a sleeve extending through such ring, ring mechanism slidably mounted upon such sleeve in engagement with the beveled side surface portion of such ring, and means for holding such rings in yielding engagement with each other, substantially as described.

5. In a joint of the class described, the combination of a shell forming a socket having an inner concave surface, a ring movably mounted in such socket having a convex surface in sliding engagement with the inner concave surface of the socket portion and having beveled side surfaces, a sleeve extending through such ring, ring mechanism slidably mounted upon such sleeve in engagement with the beveled side surface portion of such ring, and spring mechanism yieldingly connecting such ring mechanism and sleeve, substantially as described.

6. In a joint of the class described, the combination of a shell forming a socket having an inner concave surface portion, a ring movably mounted in such socket having a convex outer peripheral surface in sliding engagement with the inner concave surface of the socket portion and having beveled side surfaces, a sleeve extending through such ring, an annular shoulder upon such sleeve in engagement with one side of such ring, and a ring mounted upon such sleeve in engagement with the opposite side of such beveled ring, substantially as described.

7. In a joint of the class described, the combination of a shell forming a socket having an inner concave surface portion, a ring movably mounted in such socket having a convex outer peripheral surface in sliding engagement with the inner concave surface of the socket portion and having beveled side surfaces, a sleeve extending through such ring, an annular shoulder upon such sleeve in engagement with one side of such ring; a ring mounted upon such sleeve in engagement with the opposite side of such beveled ring having a convex surface in engagement with the adjacent beveled side surface of such ring, and spring mechanism mounted upon such sleeve and in engagement with such beveled ring, substantially as described.

8. In a joint of the class described, the combination of a shell forming a socket adapted to contain fluid under pressure, a sleeve extending into such socket provided with an annular shoulder on its inner end, and a ring having a convex outer peripheral surface in engagement with the inner wall of the socket and having a side surface on its opposite side in engagement with the annular shoulder of the sleeve, such annular shoulder and ring being exposed to the action of the fluid under pressure contained in the socket portion whereby such ring is held in air-tight engagement with the socket portion by means of the pressure of the fluid, substantially as described.

9. In a joint of the class described, the combination of a shell forming a socket adapted to contain fluid under pressure, a sleeve extending into such socket provided with an annular shoulder on its inner end, a ring having a convex outer peripheral surface in engagement with the inner wall of the socket and having a side surface on its opposite side in engagement with the annular shoulder of the sleeve, such annular shoulder and ring being exposed to the action of the fluid under pressure contained in the socket portion whereby such ring is held in air-tight engagement with the socket portion by means of the pressure of the fluid, and spring mechanism for holding such ring in engagement with the annular shoulder on the sleeve for forming an air-tight connection between such ring and sleeve, substantially as described.

10. In a joint of the class described, the combination of a shell forming a socket, a sleeve extending into such socket provided with an annular shoulder on its inner end, a ring mounted upon such sleeve in engagement with such annular shoulder and having a convex outer peripheral surface in engagement with the wall of the socket on the side opposite that which engages the shoulder of the sleeve, and means for holding such ring in engagement with the annular shoulder of the sleeve, substantially as described.

11. In a joint of the class described, the combination of a shell forming a socket, a sleeve extending into such socket provided with an annular shoulder on its inner end, a ring mounted upon such sleeve in engagement with such annular shoulder and having a convex outer peripheral surface in engagement with the wall of the socket, and spring mechanism mounted on such sleeve forming a yielding connection between the ring and sleeve, substantially as described.

12. In a joint of the class described, the combination of a shell formed of spun wrought metal, a ring of soft metal having a convex outer peripheral surface in sliding engagement with the inner surface of such socket, and a movable sleeve extending into such socket and provided with an annular shoulder in engagement with such ring, substantially as described.

13. In a joint of the class described, the combination of a shell formed of spun wrought metal, a ring of Babbitt metal having a convex outer peripheral surface in sliding engagement with the inner surface of such socket, a movable sleeve extending into such socket and provided with an annular shoulder in engagement with such ring, and means for holding such ring in engagement with the sleeve, substantially as described.

SPENCER OTIS.

Witnesses:
HARRY IRWIN CROMER,
ANNIE C. COURTENAY.